United States Patent
Engström et al.

(10) Patent No.: US 9,591,534 B2
(45) Date of Patent: Mar. 7, 2017

(54) UPDATING OF NEIGHBOR CELL INFORMATION IN A RADIO COMMUNICATIONS SYSTEM

(75) Inventors: Stefan Engström, Linköping (SE); Bo Ehrenholm, Linköping (SE); Johan Moe, Mantorp (SE); Paul Schliwa-Bertling, Ljungsbro (SE); Mikael Söderström, Vallentuna (SE); Patrik Wiman, Linköping (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 0 days.

(21) Appl. No.: 14/425,448

(22) PCT Filed: Sep. 6, 2012

(86) PCT No.: PCT/SE2012/050944
§ 371 (c)(1),
(2), (4) Date: Mar. 3, 2015

(87) PCT Pub. No.: WO2014/038988
PCT Pub. Date: Mar. 13, 2014

(65) Prior Publication Data
US 2015/0245260 A1    Aug. 27, 2015

(51) Int. Cl.
H04W 36/00 (2009.01)
H04W 24/02 (2009.01)
(Continued)

(52) U.S. Cl.
CPC ....... *H04W 36/0083* (2013.01); *H04W 16/14* (2013.01); *H04W 24/02* (2013.01); *H04W 48/16* (2013.01)

(58) Field of Classification Search
CPC ..... H04W 36/30; H04W 16/00; H04W 16/24; H04W 52/34; H04W 52/46;
(Continued)

(56) References Cited

U.S. PATENT DOCUMENTS

2007/0147283 A1* 6/2007 Laroia ................... H04W 8/005
  370/328
2009/0047955 A1* 2/2009 Frenger ................ H04J 11/0093
  455/436
(Continued)

FOREIGN PATENT DOCUMENTS

EP           2083595 A1    7/2009
WO    2012019994 A1    2/2012

OTHER PUBLICATIONS

Unknown Author, 3GPP TSG SA WG5 and RAN WG3 LTE Adhoc, "From large lists of potential neighbor cells to self-optimised neighbour cell lists", Jun. 2007, pp. 1-4, France.
(Continued)

*Primary Examiner* — Nimesh Patel
(74) *Attorney, Agent, or Firm* — Patents on Demand, P.A.; Brian K. Buccheit; Scott M. Garrett

(57) ABSTRACT

Methods, network control nodes, network nodes and user equipments for assisting the updating of neighbor cell information when a new cell is introduced, or added, to an already existing radio access network are described in this disclosure. According to an example embodiment a signal is transmitted, from a first network control node 10 associated with RAN1 to a second network control node 20 associated with RAN2. This signal comprises a cell identity CI1, e.g. a Local Cell Identity LCI1, of the newly introduced cell C109, which is added to RAN1. Next, the second network control node 20 of RAN2 receives the signal comprising the cell identity CI1 of this newly introduced cell C109. In response, the second network control node 20 transmits, to at least one user equipment 30e associated with the RAN2, a signal comprising the received cell identity CI1 of the newly introduced cell C109 as well as a request to the at least one UE 30e associated with RAN2 to search for the newly (Continued)

introduced cell C109 of RAN1, which is controlled by network node 40.

14 Claims, 6 Drawing Sheets

(51) Int. Cl.
*H04W 16/14* (2009.01)
*H04W 48/16* (2009.01)

(58) Field of Classification Search
CPC ... H04W 84/045; H04W 16/18; H04W 24/10; H04W 28/08; H04W 36/00; H04W 36/0066; H04W 36/04; H04W 52/0206; H04W 72/048; H04W 88/08; H04W 8/005; H04W 24/02; H04W 48/08; H04W 36/0061; H04W 36/08; H04W 72/0413; H04W 36/0055; H04W 92/20; H04W 36/12; H04W 48/20; H04W 52/08; H04W 84/18; H04W 48/16; H04W 12/12; H04W 40/24; H04W 88/04; H04W 24/08; H04W 36/0033; H04W 36/0038; H04W 92/02; H04W 92/24; H04L 67/10

See application file for complete search history.

(56) References Cited

U.S. PATENT DOCUMENTS

| | | | |
|---|---|---|---|
| 2009/0191862 A1* | 7/2009 | Amirijoo | H04W 36/0083 455/424 |
| 2009/0271864 A1* | 10/2009 | Dietrich | H04L 63/10 726/23 |
| 2011/0070883 A1 | 3/2011 | Wang et al. | |
| 2011/0188473 A1* | 8/2011 | Moe | H04J 11/0093 370/331 |

OTHER PUBLICATIONS

Unknown, Author, "From large lists of potential neighbour cells to self-optimised neighbour cell lists", 3GPP TSG SA WG5 and RAN WG3 LTE Adhoc, R3-071239, Mitsubishi Electric, Sophia-Antipolis, France, Jun. 13-14, 2007, 1-4.

Unknown, Author, "Options for Discovery of Inter-Frequency and Inter-RAT Neighbours", 3GPP TSG-RAN WG3 Meeting #58, R3-072275, Motorola, Jeju, Korea, Oct. 5-9, 2007, 1-3.

\* cited by examiner

UPDATING OF NEIGHBOR CELL INFORMATION IN A RADIO COMMUNICATIONS SYSTEM

TECHNICAL FIELD

Embodiments of the present invention presented herein generally relate to the field of telecommunication. More particularly, the present disclosure describes methods, network control nodes, network nodes and user equipments, UEs, which are suitable when updating neighbor cell information in a radio communications system.

BACKGROUND

Radio communication systems are rapidly growing. More and more users are utilizing the radio communication systems and the traffic in these radio communication systems is increasing. To cope with this growth, more radio network nodes (e.g. radio base stations (RBS), Node B's, eNodeB's) and more cells are being added to the already existing radio communication networks. At the same time, new Radio Access Technologies (RAT) are being added and more frequencies are being used.

To facilitate efficient mobility (with minimum interruption) between cells, cell neighbor relations (NR) are needed between the cells. The NRs are needed between cells using the same Radio Access Technology, RAT, network. Also, the NRs are needed between cells using different RATs. Conventionally, the operator of the radio communication system has to keep record of NRs of neighboring cells spanned by radio network nodes manually e.g. for the purpose of handing over to a new cell or re-selecting cell. This is a tedious and error-prone task. Furthermore, NR information may have to be changed rather frequently due to network modifications, e.g. when network nodes are added or removed (e.g. a cell is added or removed). The rapid increase of the number of cells in today's radio communication systems thus makes the manual configuration of NRs relatively resource demanding and, hence, there is a demand for functions that automatically identify and setup NRs.

Various attempts have therefore been made to facilitate the updating of neighboring cell information in an increasingly automatic manner.

To this end, the international patent application PCT/EP2011/063615, published under WO 2012/019994 A1 on 16 Feb. 2012, presents network nodes and methods for updating neighbor cell information in a radio communication system. According to this document, the radio communications system comprises a mobile terminal, a first network node controlling a first cell, a second network node controlling a second cell, the first network node broadcasting a first neighbor cell list, and the second network node broadcasting a second neighbor cell list. The method comprises the steps of receiving, by the second network node from the mobile terminal, an indicator, with the indicator indicating a missing neighbor cell relation entry in the first neighbor cell list, the neighbor cell relation entry representing a neighbor cell relation between the first cell and the second cell; and sending, from the second network node to the first network node, a cell identifier, the cell identifier uniquely identifying the second cell, and first cell-specific information technically characterizing the second cell, the first cell-specific in-formation permitting updating the first neighbor cell list with the missing neighbor cell relation entry. Thus, when a neighbor cell relation is missing, such missing neighbor cell relation can be added to a neighbor cell list afterwards.

While the above methods and networks nodes may be efficient in many respects, there is yet a constant need and desire to improve upon existing radio communication systems and to provide solutions that operate with fewer drawbacks than the pre-existing radio communication systems.

SUMMARY

It is in view of the above considerations and others that the various embodiments of the present invention have been made. The inventors have realized that there is room for further improvements with regard to the updating of neighbor cell information, especially when new cells are added to existing radio communication systems, or when the coverage area of a certain cell is significantly changed, e.g. increased.

It is therefore a general object of the various embodiments of the present invention to provide an improvement with regard to assisting the process of updating of neighbor cell information when new cells are added to existing radio communication systems, or when the coverage area of a certain cell is significantly changed, e.g. increased. More particularly, it would be advantageous to facilitate the process of setting-up, or establish, a new NR when a new cell is added, thus introduced, to an already existing radio communication network.

The various embodiments of the present invention as set forth in the appended independent claims address this general object. The appended dependent claims represent additional advantageous embodiments of the present invention.

According to a first aspect, there is provided a method for assisting in the updating of neighbor cell information in a radio communications system, the radio communications system comprising a first control node controlling at least one cell of a first radio access network RAN1, and a second network control node controlling at least one cell of a second radio access network RAN2. The method comprises: transmitting, from the first network control node to the second network control node, a signal comprising a first cell identity CI1 of a newly introduced cell when a cell has been newly introduced to the first radio access network RAN1; receiving, by the second network control node, the signal comprising the first cell identity CI1 of the newly introduced cell; and in response thereto transmitting, by the second network control node to at least one user equipment, UE, associated with the second radio access network RAN2, a signal comprising the received first cell identity CI1 of the newly introduced cell as well as a request to the at least one UE associated with the second radio access network to search for the newly introduced cell by using said first cell identity CI1.

As used here, the at least one UE is associated with the second radio access network RAN should be understood to mean that the at least one UE is controlled by a cell, which belongs to the second radio access network RAN2.

The above-mentioned first cell identity CI1 may comprise a Local Cell Identity LCI. In some embodiments, the LCI may comprise a Physical Cell Identity, PCI. In some embodiments, the LCI may comprise a scrambling code, SC. In some embodiments, the LCI may comprise a Base Station Identity Code, BSIC. In some embodiments, the LCI may additionally comprise a frequency.

The method may further comprise: receiving, by the second network control node, a signal comprising a report from the at least one UE associated with the second radio access network RAN2 that the at least one UE associated with the second radio access network RAN2 has found said newly introduced cell.

In one embodiment, the method may further comprise: transmitting, from the second network control node to the first network control node, a signal comprising a second cell identity CI2 of a cell associated with (e.g. controlling) the at least one UE associated with the second radio access network RAN2 and from which the earlier-mentioned signal comprising the report is received. In this embodiment, the method may additionally comprise transmitting, from the first network control node to at least one UE located in the newly introduced cell (which is thus associated with the first radio access network RAN1), a signal comprising a request to search for said cell associated with the at least one UE associated with the second radio access network RAN2, by using said second cell identity CI2. Moreover, the method may further comprise receiving, by the first network control node, a signal comprising a report from the at least one UE associated with the first radio access network RAN1 that the at least one UE associated with the first radio access network RAN1 has found said cell associated with the at least one UE associated with the second radio access network RAN2. Yet further, the method may comprise setting up, by the first network control node, a relation between the newly introduced cell and said cell associated with the second radio access network RAN2 for thereby updating the neighbor cell information. Additionally, the method may comprise: transmitting, from the first network control node to the second network control node, a signal comprising a request to set up a relation between the newly introduced cell and said cell associated with the at least one UE associated with the second radio access network RAN2; and in response thereto setting up, by the second network control node, a relation between the newly introduced cell and said cell associated with the at least one UE associated with the second radio access network RAN2 for thereby updating the neighbor cell information.

The above-mentioned second cell identity CI2 may comprise a Local Cell Identity LCI. In some embodiments, the LCI may comprise a Physical Cell Identity, PCI. In some embodiments, the LCI may comprise a scrambling code, SC. In some embodiments, the LCI may comprise a Base Station Identity Code, BSIC. In some embodiments, the LCI may additionally comprise a frequency.

In another embodiment, the method further comprises: setting up, by the second network control node, a relation between the newly introduced cell and a cell associated with the at least one UE associated with the second radio access network RAN2 for thereby updating the neighbor cell information. In this embodiment, the method may also comprise: transmitting, from the second network control node to the first network control node, a signal comprising a request to set up a relation between the newly introduced cell and said cell associated with the at least one UE associated with the second radio access network; and in response thereto setting up, by the first network control node, a relation between the newly introduced cell and said cell associated with the at least one UE associated with the second radio access network RAN2 (i.e. the at least one is controlled by a cell of RAN2) for thereby updating the neighbor cell information.

According to a second aspect, there is provided a method for assisting in the updating of neighbor cell information in a radio communications system. This method is performed by a first network control node controlling at least one cell of a first radio access network RAN1. The method comprises: transmitting, to a second network control node controlling at least one cell of a second radio access network RAN2, a signal comprising a first cell identity CI1 of a newly introduced cell when a cell has been newly introduced to the first radio access network.

The method may further comprise: receiving, from the second network control node, a signal comprising: a second cell identity CI2 of a cell associated with at least one UE associated with the second radio access network RAN2.

The method may also comprise: transmitting, to at least one UE located in the newly introduced cell and thus associated with the first radio access network, a signal comprising a request to search for said cell associated with the at least one UE associated with the second radio access network RAN2, by using said second cell identity CI2.

The method may additionally comprise: receiving, a signal comprising a report from the at least one UE located in the newly introduced cell and thus associated with the first radio access network RAN1 that this at least one UE associated with the first radio access network RAN1 has found said cell associated with the at least one UE associated with the second radio access network RAN2.

Furthermore, the method may also comprise setting up, thus establishing, a relation between the newly introduced cell and said cell associated with the at least one UE associated with the second radio access network RAN2 for thereby updating the neighbor cell information.

Moreover, the method may also comprise: transmitting, to the second network control node, a signal comprising a request to set up a relation between the newly introduced cell and said cell associated with the at least one UE associated with the second radio access network RAN2.

In another embodiment, the method further comprises: receiving, from the second network control node, a signal comprising a request to set up a relation between the newly introduced cell and a cell associated with the second radio access network RAN2; and in response thereto setting up a relation between the newly introduced cell and said cell associated with the second radio access network RAN2 for thereby updating the neighboring cell information.

According to a third aspect, there is provided a method for assisting in the updating of neighbor cell information in a radio communications system. This method is performed by a second network control node controlling at least one cell of a second radio access network RAN2. The method comprises: receiving, from a first network control node controlling at least one cell of a first radio access network RAN1, a signal comprising a first cell identity CI1 of a newly introduced cell when a cell has been newly introduced to the first radio access network RAN1; and in response thereto transmitting, to at least one UE associated with the second radio access network RAN2, a signal comprising the received first cell identity CI1 of the newly introduced cell as well as a request to the at least one UE associated with the second radio access network RAN2 to search for the newly introduced cell by using said first cell identity CI1.

The method may further comprise: receiving a signal comprising a report from the at least one UE associated with the second radio access network RAN2 that the at least one UE associated with the second radio access network RAN2 may have found said newly introduced cell.

The method may additionally comprise: transmitting, to the first network control node, a signal comprising: a second cell identity CI2 of a cell associated with the at least one UE associated with the second radio access network RAN2 and from which the signal comprising the report is received.

The method may also comprise: receiving, from the first network control node, a signal comprising a request to set up a relation between the newly introduced cell and said cell associated with the at least one UE associated with the second radio access network RAN2; and in response thereto setting up a relation between the newly introduced cell and said cell associated with the at least one UE associated with the second radio access network RAN2 for thereby updating the neighboring cell information.

Furthermore, the method may comprise: setting up a relation between the newly introduced cell and said cell associated with the at least one UE associated with the second radio access network RAN2 for thereby updating the neighboring cell information.

Yet further, the method may also comprise: transmitting, to the first network control node, a signal comprising a request to set up a relation between the newly introduced cell and said cell associated with the at least one UE associated with the second radio access network RAN2.

According to a fourth aspect, there is provided a method for assisting in the updating of neighbor cell information in a radio communications system. This method is performed by a user equipment, UE. The method comprises: receiving, from a second network control node controlling at least one cell of a second radio access network RAN2, a signal comprising a first cell identity CI1 of a newly introduced cell as well as a request to the UE to search for the newly introduced cell by using said first cell identity CI1; and in response thereto searching for said newly introduced cell using said first cell identity CI1.

The method may additionally comprise: transmitting, to the second network control node, a signal comprising a report that the UE has found said newly introduced cell when said newly introduced cell has been found during the step of searching for said newly introduced cell using said first cell identity CI1.

According to a fifth aspect, there is provided a first network control node for use in a radio communications system, wherein the first network control node is configured to control at least one cell of a first radio access network RAN1. The first network control node comprises: a transmitter configured to transmit, to a second network control node which is configured to control at least one cell of a second radio access network RAN2, a signal comprising a first cell identity CI1 of a newly introduced cell when a cell has been newly introduced to the first radio access network RAN1.

According to a sixth aspect, there is provided a second network control node for use in a radio communications system. The second network control node is configured to control at least one cell of a second radio access network RAN2. The second network control node comprises: a receiver configured to receive, from a first network control node which is configured to control at least one cell of a first radio access network RAN1, a signal comprising a first cell identity CI1 of a newly introduced cell when a cell has been newly introduced to the first radio access network RAN1; and a transmitter configured to transmit, to at least one UE associated with the second radio access network RAN2, a signal comprising the received first cell identity CI1 of the newly introduced cell as well as a request to the at least one UE associated with the second radio access network RAN2 to search for the newly introduced cell by using said first cell identity CI1.

According to a seventh aspect, there is provided a user equipment, UE, for use in a radio communications system, the UE comprising: a receiver configured to receive, from a second network control node which is configured to control at least one cell of a second radio access network RAN2, a signal comprising a first cell identity CI1 of a newly introduced cell as well as a request to the UE to search for the newly introduced cell by using said first cell identity; and a searcher configured to search for said newly introduced cell using said first cell identity.

BRIEF DESCRIPTION OF THE DRAWINGS

These and other aspects, features and advantages of the invention will be apparent and elucidated from the following description of embodiments of the present invention, reference being made to the accompanying drawings, in which.

DETAILED DESCRIPTION

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like numbers refer to like elements throughout the description.

Figure 1:
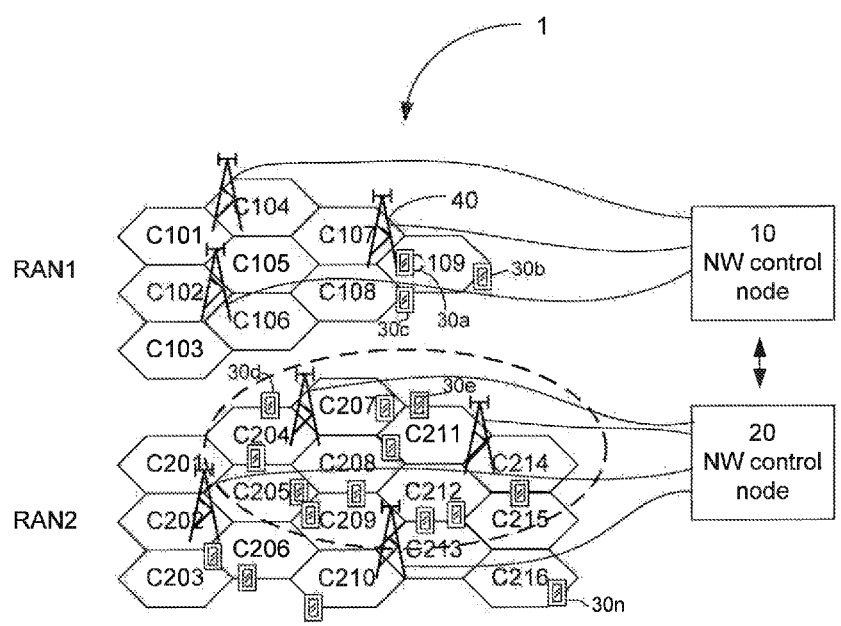
FIG. 1 illustrates a cell-based radio communication system with two radio access networks RAN1 and RAN2, respectively.

FIG. 1 illustrates a cell-based telecommunication network, or radio communication system 1, for the mere purpose of putting exemplary embodiments of the present invention into a proper context. A first network control node 10 is configured to control one ore more cells C101-C109 of a first radio access network RAN1. Furthermore, a second network control node 20 is configured to control one or more cells C201-C216 of a second radio access network RAN2.

In some embodiments, the first and second control nodes 10 and 20 could be implemented in one single, thus common, control node.

In other embodiments, the functionality of the first control node 10 could be implemented using one or more intermediate nodes. Also, the functionality of the second control node 20 could be implemented using one or more intermediate nodes. Accordingly, the functionality of the respective control node 10, 20 could be implemented in one single node. Alternatively the functionality of the respective control node 10, 20 could be implemented among a plurality of distributed nodes, which together have the functionality of the respective network control node.

The RANs, i.e. RAN1 and RAN2, cover respective geographical areas which are divided into cell areas, or cells, herein denoted C101-C109 and C201-C216, respectively. Each cell area C101-C109, C201-C216 is served by a network node, e.g. a bases station such as a radio base station (RBS), which in some networks may also be called, for example, a "NodeB" or "eNodeB". As used herein, a cell is a geographical area where radio coverage is provided by the network node (e.g. network node 40) at a network node site.

There exist various RANs e.g.: GERAN (GSM EDGE Radio Access Network), UTRAN (Universal Terrestrial Radio Access Network), E-UTRAN (Evolved Universal Terrestrial Radio Access network). In some embodiments discussed in this disclosure, the first radio access network RAN1 may be of the same type as the second radio access network RAN2. That is, if RAN1 is GERAN also RAN2 is GERAN. Similarly, if RAN1 is UTRAN RAN2 is UTRAN as well. However, in preferred embodiments the first radio access network RAN1 is different from the second radio access network RAN2. For example, RAN1 may be GERAN and RAN2 may be UTRAN. Alternatively, RAN1 may be UTRAN and RAN2 may be GERAN. In another example embodiment RAN1 is GERAN and RAN2 is E-UTRAN. In yet another example embodiment, RAN1 is UTRAN and RAN2 is E-UTRAN.

One ore more user equipments, UEs 30a-n, are also illustrated in FIG. 1. As is known by persons skilled in the technical field of this disclosure, in all 3GPP ($3^{rd}$ Generation Partnership Project) radio technologies the mobility of the UEs is built on the fact that the UEs are capable of reading, or measuring, a signal (e.g. strength and quality) from the cell by which the UE is controlled. Also, the UEs are capable of reading, or measuring, a signal (e.g. strength and quality) from surrounding cells. The UEs may distinguish between cells by decoding a cell identity.

As used throughout this disclosure, the cell identity is referred to as cell identity, CI. A cell identity of a cell belonging to RAN1 may be referred to as CI1, whereas a cell identity of a cell belonging to RAN2 may be referred to as CI2. The CI may be a locally unique cell identity, herein referred to as Local Cell Identity, LCI, e.g. LCI1 for a cell in RAN1 and LCI2 for a cell in RAN2. In E-UTRAN, the LCI may comprise a PCI (abbreviation for Physical Cell Identity). In UTRAN, the LCI may comprise a SC (abbreviation for scrambling code). In GERAN, the LCI may comprise BSIC (abbreviation for Base Station Identity Code) and frequency. If more than one frequency is utilized in E-UTRAN, the LCI may comprise a combination of PCI and frequency. If more than one frequency is utilized in UTRAN, the LCI may comprise a combination of SC and frequency. Also, in order to globally identify a cell, there is a possibility in E-UTRAN to request the UE to report the LCI (e.g. the PCI) in combination with a CGI (abbreviation for Cell Global Identity) for a particular, assigned, PCI.

Inter-RAT: RAN1<->RAN2

Figure 2:
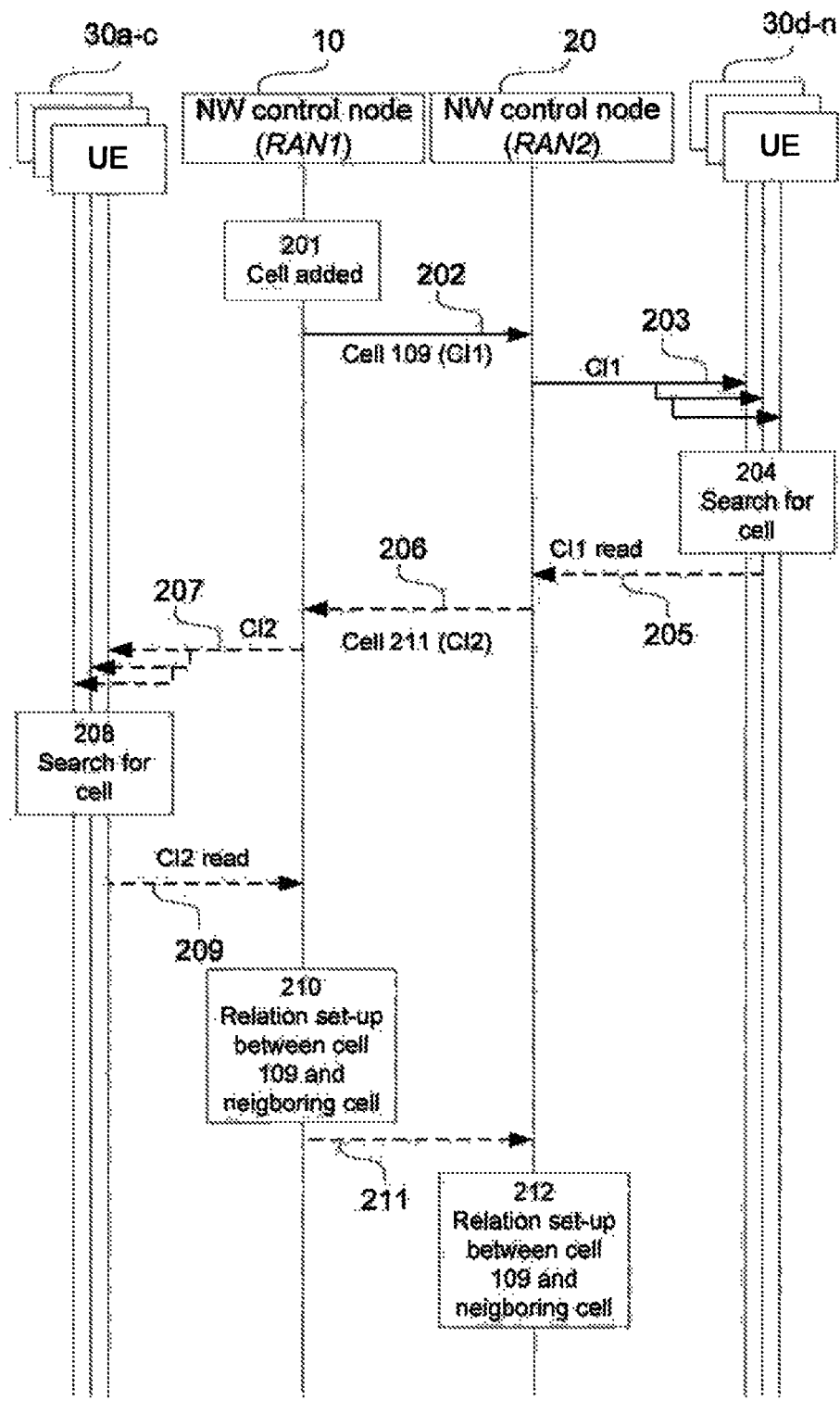
FIG. 2 is a signaling diagram illustrating a method according to an embodiment of the invention.

FIG. 2 is a signaling diagram illustrating an exemplary method according to an embodiment of the present invention.

With reference to FIGS. 1 and 2, an exemplary scenario will now be described in order to elucidate some embodiments of the present invention when a new cell, denoted C109, is added (or its coverage area is significantly changed, e.g. increased) to the first radio access network RAN1.

A new cell C109 is added 201 to the first radio access network RAN1. Next, a signal comprising a first cell identity CI1 of the newly introduced cell is transmitted 202 from the first network control node 10 to the second network control node 20. The cell identity CI1 is readable by UEs 30a-n over the air e.g. in order to distinguish between cells. In this example embodiment, the cell identity CI1 is a local cell identity LCI1. The local cell identity LCI1 may comprise a SC for UTRAN cells. The local cell identity LCI1 may comprise a combination of a BSIC and a frequency for GERAN cells.

Thus, the second network control node 20 receives the cell identity CI1 of the newly introduced cell. In response, the second network control node 20 transmits 203 a signal to one ore more UEs 30d-30n associated with the radio access network RAN2, the cells of which are controlled by the second network control node 20. This signal comprises the earlier-mentioned received first cell identity CI1 of the newly introduced C109 cell as well as a request to the one or more UEs 30d-30n (that are associated with the second radio access network RAN2) to search for the newly introduced cell C109, by using the earlier-mentioned first cell identity CI1.

The one or more UEs 30d-30n receives 203 the above-mentioned signal comprising the first cell identity CI1 of the newly introduced cell C109 as well as the request to search for the newly introduced cell C109. In response, the one or more UEs 30d-30n search 204 for said newly introduced cell C109 using said first cell identity CI1. In other words, the UE(s) associated with the second radio access network RAN2 can focus its/their search, or measurement, towards the first radio access network RAN1 based on the first cell identity CI1 of the newly introduced cell C109.

Any UE 30d-30n that can read, or measure, the first cell identity CI1 from any surrounding cell is determined to be a UE that has found a cell that may be the cell in question, i.e. the newly introduced cell C109. Next, any UE that reads, or measures, the first cell identity CI1 transmits 205, to the second network control node 20, a signal comprising a report that indicates that the UE in question has found a cell with CI1 (i.e. LCI1 this example), whereby the CI used to identify the newly introduced cell C109. Hence, the second network control node 20 receives 205 the signal comprising the report that at least one UE has found a cell with CI1 (i.e. the LCI of the newly introduced cell C109, in this example).

When the at least one UE 30d-30n associated with the second radio access network RAN2 has transmitted 205 the signal comprising the report that the at least one UE has found the CI (i.e. LCI) of the newly introduced cell C109, the second network control node 20 transmits 206 a signal to the first network control node 10. Let's assume that a UE denoted 30e of cell C211 has found the CI (i.e. LCI) of the newly introduced cell C109 which is controlled by network node 40. Then, this UE 30e transmits 205 the above-mentioned signal reporting that this UE found a cell using CI1.

This signal comprises a second cell identity CI2 pertaining to the cell associated with the at least one UE in question (e.g. cell C211 for the UE denoted 30e), which is associated with the second radio access network RAN2 and from which the signal comprising the report was received in step 205. The second cell identity CI2 is readable by UEs over the air in order to distinguish between cells. Similar to above, the second cell identity CI2 is a Local Cell Identity (LCI2) in this example. Also, similar to above, LCI2 may comprise a scrambling code (SC) for UTRAN cells and the LCI2 may comprise a combination of a BSIC and a frequency for GERAN cells.

Next, the first network control node 10 transmits 207 a signal to one or more UEs 30a-c associated with the first radio access network RAN1 and located in cell C109 (new cell). The signal which is transmitted 207 from the first network control node 10 to the one or more UEs 30a-c comprises a request to search 208, by using the above-mentioned second cell identity CI2, for a cell associated with the one or more earlier-mentioned UE(s) associated with, thus belonging to, the second radio access network RAN2. The cell associated with the one or more earlier-mentioned UE(s) means the cell, which is controlling the one or more earlier-mentioned UE(s) in question.

Any UE 30a-30c that can read, or measure, the second cell identity CI2 from any surrounding cell (e.g. C211) is determined to be a UE that has found the cell in question. The at least one UE 30a-30c that finds the above-mentioned cell using the second cell identity CI2 transmits 209, to the first network control node 10, a signal comprising a report that the UE in question has found cell (e.g. C211). Hence, the first network control node 10 receives 209 the signal comprising the report that at least one UE has found the cell, which is associated with (e.g. controlling) the at least one UE of RAN2. In other words, the first network control node 10 receives a signal comprising a report from the at least one UE associated with the first radio access network RAN1 that the at least one UE associated with, or belonging to, the first radio access network RAN1 has found said cell, which is associated with (or belongs to) the second radio access network RAN2.

If it is reported 209 by any one of the UEs 30a-c that a UE in question has found a cell associated with the second radio access network RAN2, there is a high probability that the newly introduced cell of RAN1 and the cell of RAN2 are neighboring cells. Despite the fact that the UEs of UTRAN and/or GERAN cells cannot generally report CGI, it is possible to identify new cell relations, relatively quickly, by using CI1 and CI2 as outlined above. For example, in many of the RAN2 cells the measurements are focused towards CI1 (i.e. LCI1 in this example). Also, in the newly introduced cell C109 of RAN1 the measurements are focused towards those CI2 (i.e. LCI2 in this example) that are reported back by the network control node 20 controlling the cells C201-C216 of RAN2. Thus, it is possible to filter or sort out those cells in RAN2 where UEs have read, or measured, the LCI1 of the newly introduced cell C109 and where UEs in the newly introduced cell C109 have read, or measured, the LCI2 of those cells in RAN2. All other cells, i.e. those cells where the LCI1 has not been read and those cells where LCI1 has been read but which cells have not been read by UEs in the newly introduced cell C109, may be ignored.

Consequently, if the first network control node 10 receives 209 the above-mentioned signal from at least one UE 30a-c, the first network control node 10 continues by setting up 210 a relation between the two cells (e.g. cell C109 of RAN1 and cell C211 of RAN2 in this example). In other words, the first network control node sets up 210 a relation between the newly introduced cell and the earlier-mentioned cell (e.g. cell C211) associated with (e.g. controlling) the at least one UE 30e associated with the second radio access network RAN2. Thereby, the neighbor cell information can be updated to include the new neighbor relation between the cell C109 and the cell C211.

Throughout this disclosure, setting up or establishing a relation (NR) should be understood as setting-up, or establishing, a relation from one cell to another cell. Persons skilled in the art of this disclosure will appreciate this meaning of setting-up or establishing neighbor cell relations (NR).

Additionally, the first network control node 10 may transmit 210 a signal to the second network control node 20, wherein the signal comprises a request to set up a relation between the newly introduced cell C109 and said cell C211 associated with the UE 30e which in turn is associated with the second radio access network RAN2. In response to receiving 211 this signal, the second network control node 20 sets up, or establishes, a relation for the newly introduced cell C109 (associated with RAN1) and said cell C211 (associated with RAN2). Thereby, the neighbor cell information can be updated to include the new neighbor relation between the cell C109 and the cell C211.

The above-mentioned embodiment is efficient when it comes to the required measurement effort from UEs. It can be made even more efficient if there already exists NRs between cell C109 and other cells (e.g. C107, C108) in RAN1 as well as between cells C107 and C108 and cells in RAN2 (e.g. any one of cells C204, C207, C208, C209). When the first network control node 10 of RAN1 signals the second network control node of RAN2 about the newly introduced cell C109, the first network control node 10 of RAN1 can also include the CGIs of cells C107 and C108 as well as cells C204, C207, C208, C209 (in addition to signalling the CI1, which is LCI1 in the above-discussed embodiment). In RAN2, it is then possible to limit the UE measurements for LCI1 to cells in the surroundings of cells C204, C207, C208, and C209. The knowledge of NRs between the cells in RAN1 (i.e. C107, C108 in this example) and the cells in RAN2 (i.e. cells C204, C207, C208, C209 in this example) can also be used by the first network control node 10 to decide to which one of several second network control nodes 20 the information of the new cell C109 should be sent.

Inter-RAT: RAN1 (GERAN or UTRAN)<->RAN2 (E-UTRAN)

Figure 3:
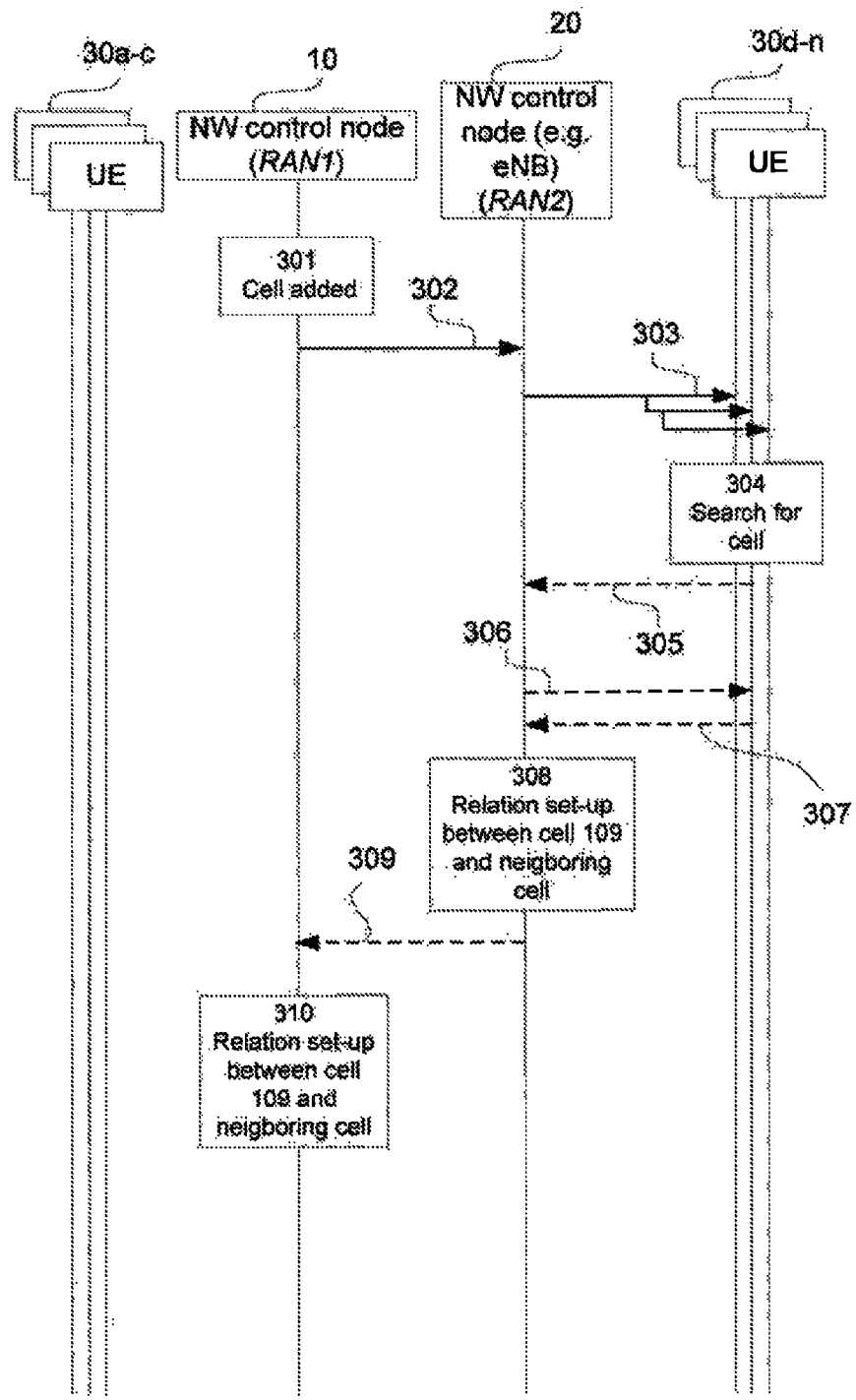
FIG. 3 is a signaling diagram illustrating a method according to another embodiment of the invention.

FIG. 3 is a signaling diagram illustrating an exemplary method according to another embodiment of the present invention.

With reference to FIGS. 1 and 3, an exemplary scenario will now be described in order to elucidate other embodiments of the present invention when a new cell, denoted C109, is added (or its coverage area is significantly changed, e.g. increased) to the first radio access network RAN1. In this example, the first radio access network RAN1 is GERAN or UTRAN and the second radio access network RAN2 is E-UTRAN.

A new cell C109 is added 301 to the first radio access network RAN1. Next, a signal comprising a first cell identity CI1 of the newly introduced cell is transmitted 302 from the first network control node 10 to the second network control node 20.

The cell identity CI1 is readable by UEs 30a-n over the air in order to distinguish between cells. In this example, the cell identity CI1 is a local cell identity (LCI1). The local cell identity LCI1 may comprise a SC for UTRAN cells. The local cell identity LCI1 may comprise a combination of a BSIC and a frequency for GERAN cells.

Thus, the second network control node 20 receives 302 the cell identity CI1 of the newly introduced cell C109. In response, the second network control node 20 transmits 303 a signal to one or more UEs 30*d*-30*n* associated with, or belonging to, a cell C201-C215 of the second radio access network RAN2, which RAN2 is controlled by the second network control node 20 (e.g. an eNodeB, eNB). In this example embodiment, it should be appreciated by persons skilled in the art that the functionality of second network control node 20 can preferably be implemented using several intermediate nodes; rather than one single control network node 20. This signal comprises the received first cell identity CI1 (i.e. LCI1 in this example) of the newly introduced cell C109 as well as a request to the one or more UEs 30*d*-30*n* (that are associated with the second radio access network RAN2; that is UEs 30*d*-*n* that are located in a cell of RAN2 and thus controlled by a network node of RAN2) to search for the newly introduced cell C109 by using said first cell identity CI1.

The one or more UEs 30*d*-30*n* receives 303 the above-mentioned signal comprising the first cell identity CI1 of a newly introduced cell C109 as well as the request to search for the newly introduced cell C109. In response, the one or more UEs 30*d*-30*n* search 304 for the newly introduced cell C109 using said first cell identity CI1. In other words, the UE(s) associated with the second radio access network RAN2 can focus its/their search towards the first radio access network RAN1 by utilizing the first cell identity CI1.

Any UE 30*d*-30*n* that can read, or measure, the first cell identity CI1 from any surrounding cell is determined to be a UE that has found a cell that may be the cell in question, i.e. cell C109 in this example. Also, any UE 30*d*-30*n* that reads, or measures, the first cell identity CI1 transmits 305, to the second network control node 20, a signal comprising a report that the UE in question has found a cell with CI1 (i.e. LCI1 in this example), the CI (i.e. LCI) used to identify said cell C109. Hence, the second network control node 20 receives 305 the signal comprising the report that at least one UE has found a cell with CI1 (i.e. LCI1), which is the CI (i.e. LCI) of the newly introduced cell C109.

If the second network control node 20 receives 305 the above-mentioned signal from at least one UE 30*d*-*n*, the second network control node 20 may continue by setting up 308 a relation between the two cells (e.g. cell C109 of RAN1 and cell C211 of RAN2 in this example). However, in preferred embodiments, the method may additionally comprise (before the relation set-up 308) sending 306 a signal comprising a request from the second control node 20 to the at least one UE 30*d*-*n* that found the newly introduced cell C109 to measure, or read, a Cell Global Identity CGI1 of the newly introduced cell C109. In response, if the at least one UE 30*d*-*n* reads, or measures, the CGI1 from the newly introduced cell C109 this is determined to be a confirmation, or indication, that the at least one UE 30*d*-*n* has indeed found the cell in question, i.e. cell C109 in this example. If so, the at least one UE 30*d*-*n* transmits 307 a signal comprising a report confirming that it measured or read the CGI1 of the newly introduced cell C109. Hence, the second control node 20 receives 307 a signal including a confirmation that the CGI1 was read, ore measured, by the same at least one UE 30*d*-*n*.

Accordingly, the second network control node sets up 308, or establishes, a relation between the newly introduced cell C109 and the earlier-mentioned cell (e.g. cell C211) associated with the at least one UE 30*e*, which is located within a cell C211 belonging to the second radio access network RAN2. Thereby, the neighbor cell information can be updated to include the new neighbor relation between the cell C109 and the cell C211.

Additionally, the second network control node 20 may transmit 309 a signal to the first second network control node 10, wherein the signal comprises a request to set up a relation between the newly introduced cell C109 and said cell C211 associated with the UE 30*e*, which UE 30*e* in turn is associated with (i.e. located in RAN2 and thus controlled by a cell of RAN2) the second radio access network RAN2. The signal may e.g. comprise CGI1 of the newly introduced cell C109 as well as CGI2 and LCI2 of the cell (e.g. C211) associated with the above-mentioned UE 30*e*. This way, the first network control node 10 has all information needed for setting-up a relation, or relationship, NR between the newly introduced cell C109 and the neighbor cell C211.

In response to receiving 309 this signal, the first network control node 10 sets up 310, or establishes, a relation NR between the newly introduced cell C109 (associated with RAN1) and said cell C211 (associated with RAN2). Thereby, the neighbor cell information can be updated to include the new neighbor relation between the cell C109 and the cell C211.

Network Control Node of RAN1

Figure 4:
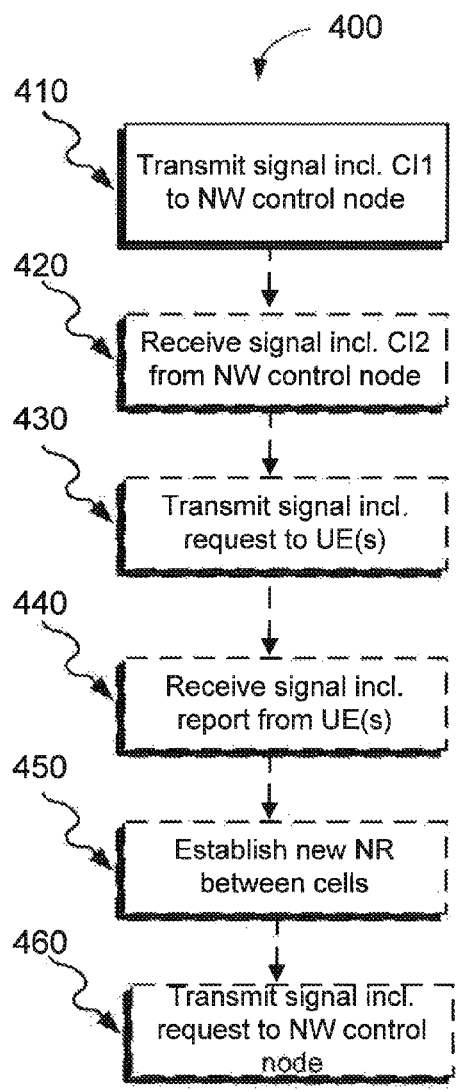
FIG. 4 is a flowchart illustrating a method according to an embodiment of the invention.

FIG. 4 illustrates a method according to an embodiment of the present invention. The method is performed by a first network control node 10, which is configured to control one or several cells of a first radio access network RAN1. Furthermore, the method is advantageously performed for assisting the updating of neighbor cell information in a radio communications system. The method comprises transmitting 410, to a second network control node 20, a signal comprising a first cell identity CI1 of a newly introduced cell C109 when a cell has been newly introduced to the first radio access network RAN1.

Next, a signal may be received 420 from the second network control node 20. This signal comprises a second cell identity CI2 of a cell (e.g. C211 in this example) associated with, or belonging to, the second radio access network RAN2.

If, or when, the signal comprising the above-mentioned second cell identity CI2 has been received, the method continues by transmitting 430, to at least one UE located in the newly introduced cell C109 (and, thus, associated with the first radio access network RAN1), a request to search for said cell C211 associated with the second radio access network RAN2, by using said second cell identity CI2.

The method may further comprise, in dependence of whether any of the one or several UEs finds cell C211, receiving 440 a signal comprising a report from the at least one UE located in the newly introduced cell C109 of the first radio access network RAN1 that this at least one UE has found said cell C211.

If at least one UE finds said cell C211, the method may hence continue by setting up, or establish 450, a relation between the newly introduced cell C109 and said cell C211 associated with the at least one UE associated with the second radio access network RAN2 for thereby updating the neighbor cell information. The neighbor cell information can thus be updated to include the new neighbor relation between the two cells, one of which is associated with, or belongs to, the first radio access network RAN1 and one of which is associated with, or belonging to, the second radio access network RAN2.

Additionally, the method may comprise transmitting 460, to the second network control node 20, a signal comprising a request to set up a relation between the newly introduced cell C109 and said cell C211 associated with the at least one UE associated with the second radio access network RAN2, i.e. the at least one UE that is controlled by a network node of RAN2.

The disclosed method steps of method 400 can be performed in a different order than the specific order illustrated in FIG. 4. Furthermore, not all steps need to be performed in order to achieve the advantages of various embodiments of the present invention.

Figure 5:
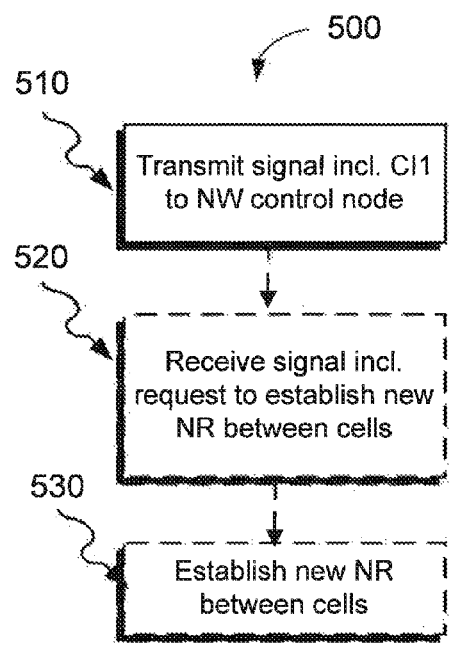
FIG. 5 is a flowchart illustrating a method according to another embodiment of the invention.

FIG. 5 illustrates a method according to another embodiment of the present invention. The method is performed by a first network control node 10, which is configured to control one or several cells of a first radio access network RAN1. Furthermore, the method is advantageously performed for assisting the updating of neighbor cell information in a radio communications system. The method comprises transmitting 510, to a second network control node 20, a signal comprising a first cell identity CI1 of a newly introduced cell C109 when a cell has been newly introduced to the first radio access network RAN1.

Next, the method may further comprise receiving 520 a signal from the second network control node 20, whereby the signal includes a request to set up a relation between the newly introduced cell C109 in the first radio access network RAN1 and a cell C211 associated with the second radio access network RAN2. In response, a relation between the newly introduced cell C109 and said cell C211 associated with the second radio access network can be set-up, or established 530. Accordingly, the neighboring cell information can be updated to include the new neighbor cell relation.

The disclosed method steps of method 500 can be performed in a different order than the specific order illustrated in FIG. 5. Furthermore, not all steps need to be performed in order to achieve the advantages of various embodiments of the present invention.

Figure 6:
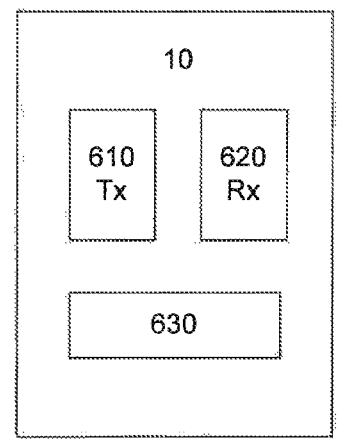
FIG. 6 is a block diagram of an example embodiment of a first network control node.

FIG. 6 illustrates an embodiment of an example embodiment of a first network control node 10. The network control node 10 may be configured to execute the method 400 and/or method 500 described hereinabove. The first network control node 10 is advantageously used in a radio communications system 1. The first network control node 10 is also configured to control at least one cell of a first radio access network RAN1.

In the disclosed embodiment, the first network control node 10 comprises a transmitter 610 configured to transmit, to a second network control node 20 which is configured to control one or more cells of a second radio access network RAN2, a signal comprising a first cell identity CI1 of a newly introduced cell (e.g. cell C109 of FIG. 1) when a cell has been newly introduced to the first radio access network RAN1.

The first network control node 10 may also comprise a receiver 620. The receiver 620 may be configured to receive a signal from the second network control node 20, wherein this signal comprises a second cell identity CI2 of a cell associated with the second radio access network RAN2.

The transmitter 610 may be further configured to transmit, to at least one UE associated with the first radio access network RAN1, a request to search for a said cell (e.g. C211) associated with the at least one UE associated with or belonging to a cell of the second radio access network RAN2, by using said second cell identity CI2.

The receiver 620 may be further configured to receive a signal comprising a report from the at least one UE associated with (thus, belonging to) a cell of the first radio access network RAN1 that the at least one UE associated with the first radio access network RAN1 has found said cell, e.g. C211.

The first network control node 10 may further comprise a neighbor cell relation handler 630. The neighbor cell relation handler 630 may be configured to handle neighbor cell relations of cells in a cell-based radio communication system 1. To this end, the neighbor cell relation handler 630 may be configured to set-up, or establish, a relation between a newly introduced cell C109 (associated with a first radio access network RAN1) and a cell C211 (associated with the second radio access network RAN2). Thus, the neighbor cell relation handler 630 may be configured to update the neighbor cell information. This neighbor cell information may, e.g., be included into an already existing neighbor cell information list, which may be part of the neighbor cell relation handler.

Moreover, the transmitter 610 may be further configured to transmit, to the second network control node 20, a signal comprising a request to set up a relation between the newly introduced cell C109 and a cell C211 associated with the second radio access network RAN2.

As will be appreciated by persons skilled in the art, the first network control node 10 may comprise additional components, or units, as well. However, in order to ease the reading of this disclosure these and other conventional components of network control nodes have been omitted from the drawings. Thus, only those components, or units, which are of interest for explaining the various embodiments of the first network control node 10, have been illustrated in FIG. 5.

Network Control Node of RAN2

Figure 7:
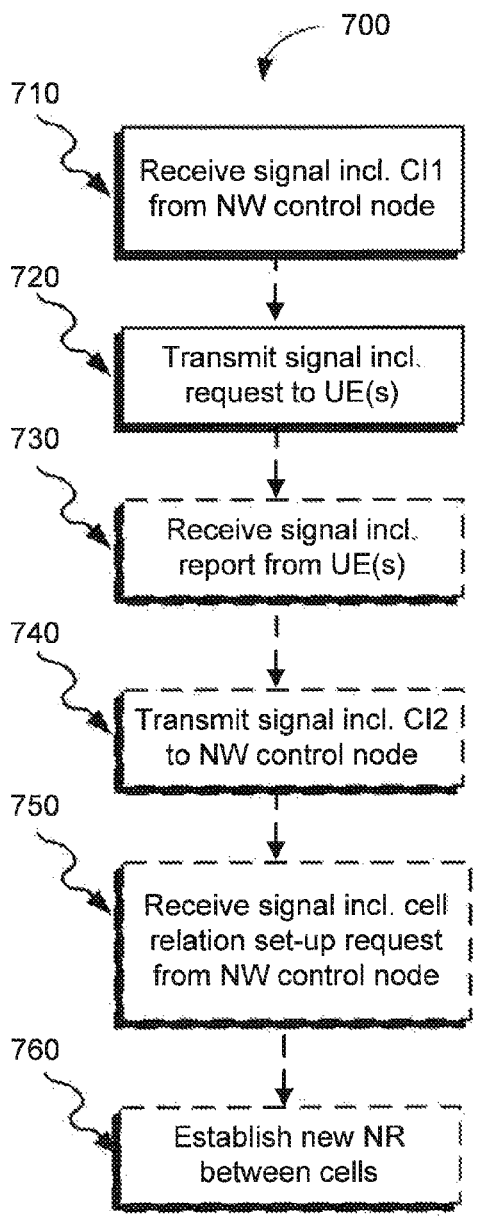
FIG. 7 is a flowchart illustrating a method according to an embodiment of the invention.

FIG. 7 illustrates a method according to an embodiment of the present invention. The method in FIG. 7 is performed by a second network control node 20, which is configured to control one or more cells C201-C216 of a second radio access network RAN2, the second radio access network RAN2 preferably (but not necessarily) being different from the earlier-mentioned first radio access network RAN1. The method is advantageously performed for assisting the updating of neighbor cell information in a radio communications system 1. The method comprises receiving 710, from a first network control node 10 controlling at least one cell of a first radio access network RAN1, a signal comprising a first cell identity CI1 of a newly introduced cell when a cell has been newly introduced to the first radio access network RAN1. In response to receiving 710 this signal, the method continues by transmitting 720, to one or several UEs associated with, thus belonging to, the second radio access network RAN2, a signal comprising the first cell identity CI1 of the newly introduced cell C109 as well as a request to the one or more UE(s) associated with (thus, belonging to) the second radio access network RAN2 to search for the newly introduced cell by using said first cell identity CI1.

If, or when, any of the UEs has found the identity CI1 of the above-mentioned newly introduced cell C109, the method may continue to step 730. In step 730, a signal is received by the second network control node 20. This signal comprises a report from the at least one UE which is controlled by a cell of the second radio access network RAN2 that this at least one UE associated with the second radio access network RAN2 has found the identity CI1 of the newly introduced cell C109. Subsequently, the method continues by transmitting 740, to the first network control node 10, a signal comprising: a second cell identity CI2 of a cell associated with the at least one UE associated with the second radio access network RAN2 and from which the signal comprising the report is received in step 730.

The method 700 may also comprise receiving 750, from the first network control node 10, a signal comprising a request to set up a relation between the newly introduced cell C109 and a cell C211 associated with the second radio access network RAN2. In response, the method 700 may additionally comprise setting up 760, or establishing, a relation between the newly introduced cell C109 and said cell C211 associated with the second radio access network RAN2 for thereby updating the neighboring cell information.

The disclosed method steps of method 700 can be performed in a different order than the specific order illustrated in FIG. 7. Furthermore, not all steps need to be performed in order to achieve the advantages of various embodiments of the present invention. For example, FIG. 8 illustrates an alternative embodiment of a method 800 performed by the second network control node.

Figure 8:
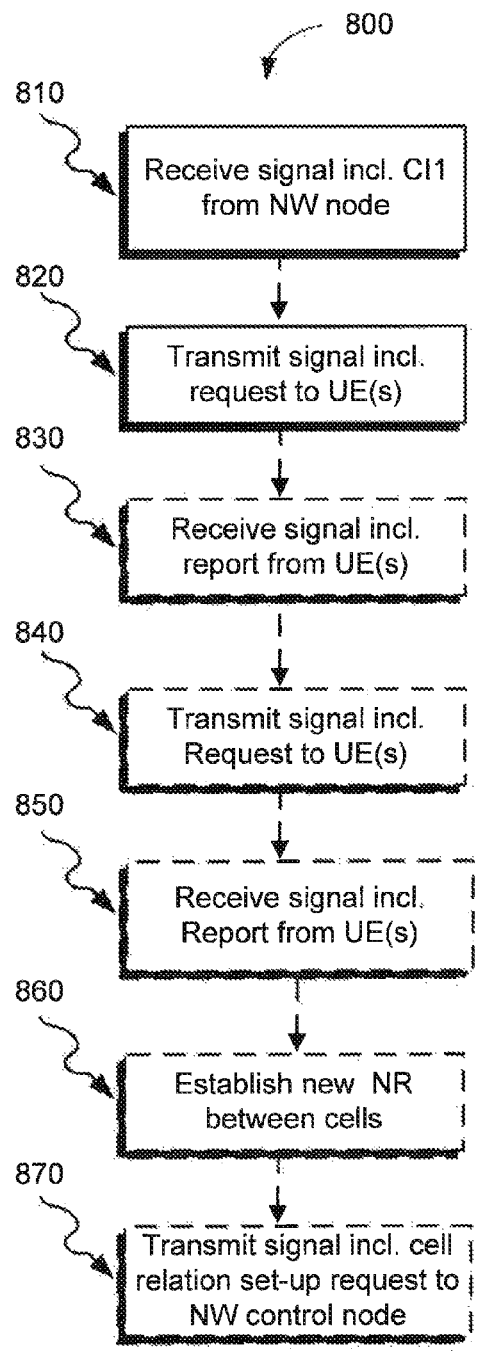
FIG. 8 is a flowchart illustrating a method according to another embodiment of the invention.

The method disclosed in FIG. 8 comprises receiving 810, from a first network control node 10 controlling at least one cell of a first radio access network RAN1, a signal comprising a first cell identity CI1 of a newly introduced cell when a cell has been newly introduced to the first radio access network RAN1.

In response to receiving 810 this signal, the method continues by transmitting 820, to one ore several UEs associated with the second radio access network RAN2, a signal comprising the first cell identity CI1 of the newly introduced cell as well as a request to the one or more UE(s) belonging to the second radio access network RAN2 to search for a the newly introduced cell C109 by using said first cell identity CI1.

If, or when, any of the UEs has found the identity CI1 of the above-mentioned cell C109, the method may continue to step 830. In step 830, a signal is received by the second network control node 20. This signal comprises a report from the at least one UE, which is controlled by a cell C211 belonging to the second radio access network RAN2 that this at least one UE has found the identity CI1 of said cell C109.

The method may additionally comprise sending 840 a signal comprising a request from the second control node 20 to the at least one UE 30d-n that found the newly introduced cell C109 to measure, or read, CGI1 of the newly introduced cell C109. In response, if the at least one UE 30d-n reads, or measures, the CGI1 from the newly introduced cell C109 this is determined to be a confirmation, or indication, that the at least one UE 30d-n has indeed found the cell in question, i.e. cell C109 in this example. If so, the at least one UE 30d-n transmits 850 a signal comprising a report confirming that it measured or read the CGI1 of the newly introduced cell C109. Hence, the second control node 20 receives 850 a signal comprising a report, the report including a confirmation that the CGI1 was read, ore measured, by the same at least one UE 30d-n.

Next, the method 800 may continue by setting up 860, or establishing, a relation between the newly introduced cell and said cell associated with the second radio access network RAN2 for thereby updating the neighboring cell information. Optionally, and advantageously, the method may further comprise transmitting 870, to the first network control node 10, a signal comprising a request to set up a relation between the newly introduced cell and a cell associated with the second radio access network RAN2

Figure 9:
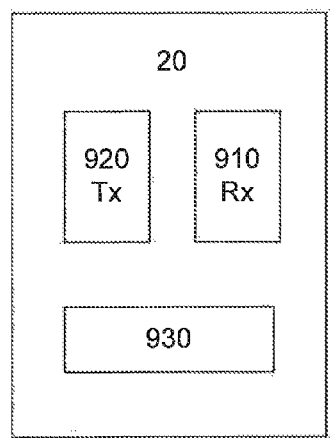
FIG. 9 is a block diagram of an example embodiment of a second network control node.

FIG. 9 illustrates an embodiment of an example embodiment of a second network control node 20. The network node 20 may be configured to execute any one or both of the methods described with respect to FIGS. 7 and 8, respectively. The second network control node 20 is advantageously used in a radio communications system 1. The second network control node 20 is also configured to control at least one cell of a second radio access network RAN2.

In the disclosed embodiment, the second network control node 20 comprises a receiver 910 configured to receive, from a first network control node 10 which is configured to control at least one cell of a first radio access network RAN1, a signal comprising a first cell identity CI1 of a newly introduced cell when a cell has been newly introduced to the first radio access network RAN1. Additionally, the second network control node 20 comprises a transmitter 920 configured to transmit, to at least one UE associated with the second radio access network RAN2, a signal comprising a received first cell identity CI1 of a newly introduced cell as well as a request to the at least one UE associated with the second radio access network RAN2 to search for the newly introduced cell by using said first cell identity.

The receiver 910 may further be configured to receive a signal comprising a report from the at least one UE associated with the second radio access network RAN2 that the at least one UE associated with the second radio access network RAN2 has found said cell.

The transmitter 920 may be further configured to transmit, to the first network control node 10, a signal comprising: a second cell identity CI2 of a cell associated with the at least one UE, which in turn is associated with or belongs to the second radio access network RAN2.

The transmitter 920 may additionally be configured to transmit a signal comprising a request from the second control node 20 to the at least one UE 30d-n that found the newly introduced cell C109 to measure, or read, CGI1 of the newly introduced cell C109 as described with reference to FIG. 8. The receiver 910 may additionally be configured to receive a signal comprising a report, wherein the report includes a confirmation that the CGI1 was read, ore measured, by the same at least one UE 30d—as was also described with reference to FIG. 8

The network control node 20 may also comprise a neighbor cell relation handler 930. The neighbor cell relation handler 930 may be configured to handle neighbor cell relations of cells in a cell-based radio communication system 1. To this end, the neighbor cell relation handler 930 may be configured to establish, or set-up, a relation between the newly introduced cell and said cell associated with the at least one UE associated with the second radio access network RAN2 for thereby updating the neighboring cell information. In one embodiment, the neighbor cell relation handler 930 may be configured to establish, or set-up, said relation in response to the receiver 910 having received from the first network control node 10, a signal comprising a request to set up a relation between the newly introduced cell and said cell associated with the at least one UE associated with the second radio access network (RAN2).

Also, in some embodiments, the transmitter 920 is further configured to transmit, to the first network control node 10, a signal comprising a request to set up a relation between the newly introduced cell and said cell associated with the at least one UE associated with the second radio access network RAN2.

As will be appreciated by persons skilled in the art, the second network control node 20 may comprise additional components, or units, as well. However, in order to ease the reading of this disclosure these and other conventional components of network control nodes have been omitted from the drawings. Thus, only those components, or units, which are of interest for explaining the various embodiments of the second network control node 20 have been illustrated in FIG. 8.

User Equipment

Figure 10:
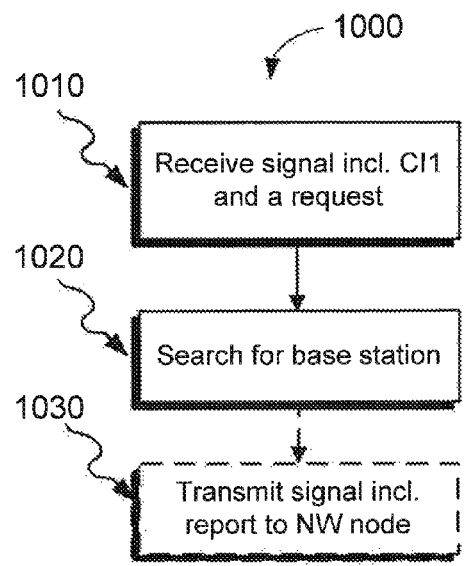
FIG. 10 is a flowchart illustrating a method according to an embodiment of the invention.

FIG. 10 illustrates a method 1000 according to an embodiment of the present invention. This method is performed by a user equipment, UE. The term UE as used in this disclosure comprises any device used by a user to communicate. As such, the UE may be a mobile terminal. More particularly, the UE may be a mobile communication terminal. The term mobile communication terminal includes devices such as mobile telephones (also knows as cellular phones, cellphones, smartphones), tablet computers or the like.

The method can be advantageously performed for assisting in the updating of neighbor cell information in a radio communications system 1. The method comprises receiving 1010, from a second network control node 20 which is configured to control one or several cells of a second radio access network RAN2, a signal comprising a first cell identity CI1 of a newly introduced cell C109 as well as a request to the UE to search for the newly introduced cell C109 by using said first cell identity CI1. Upon receiving 1010 said signal, the UE searches 1020 for said cell C109 using said first cell identity CI1.

Yet further, the method may optionally comprise transmitting 1030, to the second network control node 20, a signal comprising a report that the UE has found said cell C109 when said cell has been found during the step of searching for said cell by using said first cell identity CI1.

Figure 11:
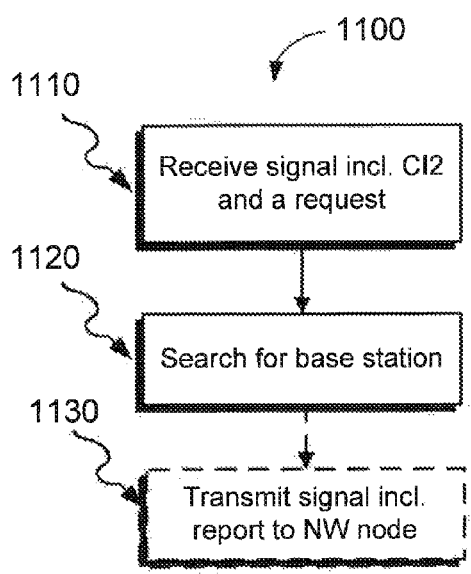
FIG. 11 is a flowchart illustrating a method according to another embodiment of the invention.

FIG. 11 illustrates a method 1100 according to an alternative embodiment of the present invention. This method is also performed by a user equipment, UE.

The method comprises receiving 1110, from a first network control node 10 which is configured to control one or several cells of a first radio access network RAN1, a signal comprising a second cell identity CI2 of a cell associated with a second radio access network RAN2 as well as a request to the UE to search for a cell associated with, or belonging to, a second radio access network RAN2, by using the second cell identity CI2. Upon receiving 1110 said signal, the UE searches 1120 for said cell using said second cell identity CI2.

If the UE reads, or measures, the second cell identity CI2 from any surrounding cell it can be determined that the UE that has found the cell in question. The method may therefore additionally comprise transmitting 1130, to the first network control node 10, a signal comprising a report that the UE has found said cell that was searched for.

Figure 12:
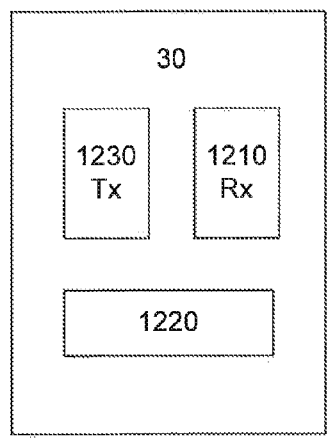
FIG. 12 is a block diagram of an example embodiment of a user equipment.

FIG. 12 illustrates an embodiment of an example embodiment of a user equipment, UE, 30. The UE 30 may be configured to execute any one or both of the methods described with respect to FIGS. 10 and 11, respectively. To this end, the UE comprises a receiver 1210. The receiver 1210 may be configured to receive, from a second network control node 20 which is configured to control one or several cells of a second radio access network RAN2, a signal comprising a first cell identity CI1 of a newly introduced cell as well as a request to the UE to search for a newly introduced cell C109 by using said first cell identity CI1. Furthermore, the UE comprises a searcher 1220 configured to search for said cell using said first cell identity CI1 when the receiver 1210 has received the earlier-mentioned signal.

The receiver 1210 may additionally, or alternatively, be configured to receive, from a first network control node 10, a signal comprising a second cell identity CI2 of a cell associated with a second radio access network RAN2 as well as a request to the UE to search for a cell associated with the said cell belonging to the second radio access network RAN2, by using the second cell identity CI2. The searcher 1220 may also be further configured to search for said cell using said second cell identity CI2 when the receiver 1210 has received this signal.

Furthermore, the UE may comprise a transmitter 1230. The transmitter may be configured to send a signal comprising a report that the UE has found said cell, if the UE has found said cell during an earlier search.

As will be appreciated by persons skilled in the art, the UE may comprise additional components, or units, as well—particularly such components that are conventional for UEs. For example, the UE may comprise a user interface, e.g. including a touch screen display, a microphone, and a loudspeaker, etc. all of which are conventional components of UEs. However, in order to ease the reading of this disclosure these and other conventional components have been omitted from the drawings. Thus, only those components, or units, which are of interest for explaining the various embodiments of the UE have been illustrated in the figures.

The various embodiments of the present invention discussed in this disclosure provides for a facilitated process of setting up, or establish, neighboring cell relations, NR, when a new cell has been newly introduced, thus added, to an already existing radio access network. The various embodiments also address the situation where the radio communication system comprises more than one radio access network, e.g. RAN1 and RAN2. When a cell is added in a first radio access network RAN1, the cell identity CI1 of this cell is transmitted to a network control node of a second radio access network RAN2. This network control node of the second radio access network RAN2 can thus focus or intensify UE supported searches (or, measurements) by using this specific cell identity CI1.

In the detailed description hereinabove, for purposes of explanation and not limitation, specific details are set forth such as particular architectures, interfaces, techniques, etc. in order to provide a thorough understanding of various embodiments of the present invention. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Although the present invention has been described above with reference to specific embodiments, it is not intended to be limited to the specific form set forth herein. Rather, the invention is limited only by the accompanying claims and other embodiments than the specific above are equally possible within the scope of the appended claims. Also, the appended claims are intended to cover equivalents. For example, while the claims are directed to the situation where a cell is newly introduced to an already existing radio access network it should be appreciated that essentially the same effects and advantages are achieved in essentially the same way in situations where the coverage area of an existing cell is significantly changed (e.g. increased). As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method for assisting in the updating of neighbor cell information in a radio communications system, the method being performed by a first network control node controlling at least one cell of a first radio access network (RAN) and comprising:
    transmitting, from the first radio access network control node to a second radio access network control node, a signal comprising a first cell identity of a newly introduced cell, when a cell has been newly introduced to the first radio access network, wherein the second radio access network control node transmits a signal comprising the first cell identity and a request to a first UE associated with a second radio access network to search for the newly introduced cell, and wherein the first cell identity is used by the first UE associated with the second radio access network to identify the newly introduced cell, which is conveyed from the first UE to the second radio access network control node within a report indicating that the first UE has found the newly introduced cell responsive to a search; and
    receiving, at the first radio access network control node from the second network control node, a signal comprising a second cell identity of a second cell associated with a second UE, associated with the second radio access network, said signal from the second network control node including a request to set up neighboring cell information between the newly introduced cell and the second cell;
    setting up, at the first radio access network control node, the neighboring cell information between the newly introduced cell and the second cell, which updates neighboring cell information at the first radio access network control node to indicate that the newly introduced cell of the first radio access network and the second cell of the second radio access network are neighboring cells, wherein the setting up occurs at the first radio network node using reported local cell identity information despite a fact that the first and second UE do not report cell global identity (CGI) for the newly introduced cell.

2. The method according to claim 1, further comprising: transmitting, to the second UE located in the newly introduced cell and thus associated with the first radio access network, a signal comprising a request to search for said second cell associated with the second UE associated with the second radio access network, by using said second cell identity.

3. The method according to claim 2, further comprising: receiving, a signal comprising a report from the first UE located in the newly introduced cell and thus associated with the first radio access network that the first UE associated with the first radio access network has found said first cell associated with the first UE associated with the second radio access network.

4. The method according to claim 3, further comprising: setting up a relation between the newly introduced cell and said cell associated with the first UE associated with the second radio access network, for updating the neighbor cell information.

5. The method according to claim 3, further comprising: transmitting, to the second radio access network control node, a signal comprising a request to set up a relation between the newly introduced cell and said second cell.

6. A method for assisting in the updating of neighbor cell information in a radio communications system, the method being performed by a second network control node controlling at least one cell of a second radio access network and comprising:
    receiving, at a second radio access control node from a first network control node controlling at least one cell of a first radio access network, a signal comprising a first cell identity of a newly introduced cell when a cell has been newly introduced to the first radio access network, wherein the second radio access network control node transmits a signal comprising the first cell identity and a request to a first UE associated with a second radio access network to search for the newly introduced cell, and wherein the first cell identity is used by the first UE associated with the second radio access network to identify the newly introduced cell, which is conveyed from the first UE to the second radio access network control node within a report indicating that the first UE has found the newly introduced cell responsive to a search;
    in response thereto, transmitting, at the second radio access network control node to a first UE associated with the second radio access network, a signal comprising the received first cell identity of the newly introduced cell said signal from the second network control node including a request to set up neighboring cell information between the newly introduced cell and the second cell;
transmitting, to the first network control node, a signal comprising a second cell identity of a second cell associated with a second UE associated with the second radio access network; and
setting up, at the second radio access network control node, the neighboring cell information between the newly introduced cell and the second cell, which updates neighboring cell information at the second radio access network control node to indicate that the newly introduced cell of the first radio access network and the second cell of the second radio access network are neighboring cells, wherein the setting up occurs at the second radio network node using reported local cell identity information despite a fact that the first and second UE do not report cell global identity (CGI) for the newly introduced cell.

7. The method according to claim 6, further comprising:
receiving a signal comprising a report from the second associated with the second radio access network that the second UE associated with the second radio access network has found said newly introduced cell.

8. The method according to claim 7, further comprising: setting up a relation between the newly introduced cell and said second cell associated with the second UE associated with the second radio access network, for updating the neighboring cell information.

9. The method according to claim 8, further comprising: transmitting, to the first network control node, a signal comprising a request to set up a relation between the newly introduced cell and said second cell.

10. A method for assisting in the updating of neighbor cell information in a radio communications system, the method being performed by a user equipment (UE) and comprising:
receiving, from a second radio access network control node controlling at least one cell of a second radio access network, a signal comprising a first cell identity of a newly introduced cell and a request to a first UE to search for the newly introduced cell by using said first cell identity, wherein the newly introduced cell is a cell that has been newly introduced to the first radio access network, wherein a first radio access control network control node transmitted the first cell identity to the second radio access network control node;
in response thereto, searching for said newly introduced cell using said first cell identity,
conveying from the first UE to the second radio access network control node within a report indicating that the first UE has found the newly introduced cell responsive to a search; and
transmitting, to the second network control node, a signal comprising a second cell identity of a cell associated with the UE associated with the second radio access network; and
conveying from the first UE to the second radio access network control node neighboring cell information between the newly introduced cell and a second cell, wherein the second radio access network control node conveys the neighboring cell information to the first radio access control node, wherein the first radio access network control node sets up the neighboring cell information between the newly introduced cell and the second cell, which updates neighboring cell information at the first radio access network control node to indicate that the newly introduced cell of the first radio access network and the second cell of the second radio access network are neighboring cells, wherein the setting up occurs at the first radio network node using reported local cell identity information despite a fact that the first UE does not report cell global identity (CGI) for the newly introduced cell.

11. The method according to claim 10, further comprising:
transmitting, to the second network control node, a signal comprising a report that the first UE has found said newly introduced cell when said newly introduced cell has been found during the step of searching for said newly introduced cell using said first cell identity.

12. A first network control node for use in a radio communications system, wherein the first network control node is configured to control at least one cell of a first radio access network, the first network control node comprising:
a transmitter configured to transmit, to a second network control node a signal comprising a first cell identity of a newly introduced cell when a cell has been newly introduced to the first radio access network, wherein the second radio access network control node transmits a signal comprising the first cell identity and a request to a first UE associated with a second radio access network to search for the newly introduced cell, and wherein the first cell identity is used by the first UE associated with the second radio access network to identify the newly introduced cell, which is conveyed from the first UE to the second radio access network control node within a report indicating that the first UE has found the newly introduced cell responsive to a search;
and
a receiver configured to receive, from the second network control node, a signal comprising a second cell identity of a second cell associated with a second UE, associated with the second radio access network, said signal from the second network control node including a request to set up neighboring cell information between the newly introduced cell and the second cell;
circuitry for setting up, at the first radio access network control node, the neighboring cell information between the newly introduced cell and the second cell, which updates neighboring cell information at the first radio access network control node to indicate that the newly introduced cell of the first radio access network and the second cell of the second radio access network are neighboring cells, wherein the setting up occurs at the first radio network node using reported local cell identity information despite a fact that the first and second UE do not report cell global identity (CGI) for the newly introduced cell.

13. A second network control node for use in a radio communications system, wherein the second network control node is configured to control at least one cell of a second radio access network, the second network control node comprising:
a receiver configured to receive, from a first network control node that is configured to control at least one cell of a first radio access network, a signal comprising a first cell identity of a newly introduced cell when a cell has been newly introduced to the first radio access network, wherein the second radio access network control node transmits a signal comprising the first cell identity and a request to a first UE associated with a second radio access network to search for the newly introduced cell, and wherein the first cell identity is used by the first UE associated with the second radio access network to identify the newly introduced cell, which is conveyed from the first UE to the second radio access network control node within a report indicating that the first UE has found the newly introduced cell responsive to a search; and a transmitter configured to:

transmit, to a first UE associated with the second radio access network, a signal a signal comprising the received first cell identity of the newly introduced cell said signal from the second network control node including a request to set up neighboring cell information between the newly introduced cell and the second cell; and transmit, to the first network control node, a signal comprising a second cell identity of a second cell associated with a second UE associated with the second radio access network; and circuitry for setting up, at the second radio access network control node, the neighboring cell information between the newly introduced cell and the second cell, which updates neighboring cell information at the second radio access network control node to indicate that the newly introduced cell of the first radio access network and the second cell of the second radio access network are neighboring cells, wherein the setting up occurs at the second radio network node using reported local cell identity information despite a fact that the first and second UE do not report cell global identity (CGI) for the newly introduced cell.

14. A user equipment (UE) for use in a radio communications system, the UE comprising:

a receiver configured to receive, from a second radio access network control node that is configured to control at least one cell of a second radio access network, a signal comprising a first cell identity of a newly introduced cell and a request to a first UE to search for the newly introduced cell by using said first cell identity, wherein the newly introduced cell is a cell that has been newly introduced to the first radio access network, wherein a first radio access control network control node transmitted the first cell identity to the second radio access network control node;

a searcher circuit configured to search for said newly introduced cell using said first cell identity; and a transmitter configured to transmit, to the second radio access network control node, a signal comprising a second cell identity of a cell associated with the UE associated with the second radio access network, and further configured to convey from the first UE to the second radio access network control node neighboring cell information between the newly introduced cell and a second cell, wherein the second radio access network control node conveys the neighboring cell information to the first radio access control node, wherein the first radio access network control node sets up the neighboring cell information between the newly introduced cell and the second cell, which updates neighboring cell information at the first radio access network control node to indicate that the newly introduced cell of the first radio access network and the second cell of the second radio access network are neighboring cells, wherein the setting up occurs at the first radio network node using reported local cell identity information despite a fact that the first UE does not report cell global identity (CGI) for the newly introduced cell.

* * * * *